UNITED STATES PATENT OFFICE.

FRANCIS EDWARD MATTHEWS, HENRY JAMES WHEELER BLISS, AND HARRY MONTAGU ELDER, OF LONDON, ENGLAND.

MANUFACTURE OF UNSATURATED HYDROCARBONS.

1,198,944. Specification of Letters Patent. Patented Sept. 19, 1916.

No Drawing. Original application filed June 28, 1913, Serial No. 776,342. Divided and this application filed November 25, 1913. Serial No. 803,066.

*To all whom it may concern:*

Be it known that we, FRANCIS EDWARD MATTHEWS, of 7 Staple Inn, London, England, HENRY JAMES WHEELER BLISS, of Ingram House, Stockwell, London, England, and HARRY MONTAGU ELDER, of 28$^b$ Albemarle street, London, England, all subjects of the King of Great Britain, have invented new and useful Improvements in the Manufacture of Unsaturated Hydrocarbons, of which the following is a specification.

The present application is a division of our copending application Serial No. 776,342, filed June 28th, 1913.

In the preparation of unsaturated hydrocarbons from the halids of hydrocarbons by abstraction of halogen acid, the methods hitherto in use have depended upon the combinations of the acid with alkalis or bases. The decomposition of some halids, to form unsaturated bodies, by heat (for example during distillation) or by treatment with, for example, aluminium chlorid, has also been observed. It has also been proposed to pass the vapors of the halids over certain contact substances such for example as barium chlorid as a practical means of eliminating halogen acid.

We have now found that steam is a suitable and effective agent for the preparation of unsaturated hydrocarbons from monohalids. The action of the steam, may, if desired, be combined with the action of catalytic substances. The temperature required varies according to the mono-halid used, but it should be the temperature at which the halogen acid is freely evolved and be above that at which glycol (or unsaturated alcohol) is formed, while it should be kept below that at which any considerable decomposition of the product occurs.

It has also been observed that some monohalids yield a proportion of an unsaturated hydrocarbon when heated with water, and that others yield an alcohol, but there has been provided no satisfactory practical method of preparation of the unsaturated hydrocarbon in these manners.

In order to carry out our invention we subject the mono-halid to the action of steam at a suitable temperature, and this can conveniently be effected by passing the vapors of the mono-halid together with steam through a heated tube. Or both the monohalid and water may be vaporized together, the steam for the reaction being then formed in the tube itself.

Suitable catalytic substances are those (for example, phosphoric acid) which split off water from alcohols, or those which split off halogen acids, (for example, the catalysts mentioned in Meyer & Jacobsen Vol. 1, (1907) page 277 such as cobalt chlorid, ferrous chlorid, lead chlorid, barium chlorid, nickel chlorid, or copper chlorid, or the corresponding bromids or certain other halogen compounds, particularly aluminum bromid,) but the use of these, or any other catalysts is not as a rule required if a sufficiently elevated temperature be used.

The following are examples of how this invention can be performed, but the invention is not limited to these examples.

Example 1: 50 grams of hexyl chlorid (prepared by the chlorination of hexane vapor, for instance as described in the specification of application for British Letters Patent No. 13051 A. D. 1912 with, say, about 150 grams of water) are passed through a tube heated in a combustion furnace to a dull red heat. The product is condensed, steam distilled, separated, and redistilled. The principal fraction obtained is a hydrocarbon boiling at from 60°–65° centigrade. Other monochlor hydrocarbons may be similarly treated.

Example 2: In the preparation of butadiene from 2.3 dichlorbutane described and claimed in our co-pending application for U. S. patent Serial No. 776,342, filed June 28, 1913, of which the present case is a division, it is stated that a proportion of unsaturated chlorid *i. e.* chlor-butylene, $CH_3CHClCH=CH_2$ may be formed. This last named product is allowed to flow with say twice its weight of water into a vessel which is maintained at a temperature of say from 600° to 700° centigrade. Or its vapor may be passed through a heated tube together with steam. The issuing vapors are passed through a condenser in which the water and hydrochloric acid are condensed. Any HCl remaining uncondensed may be removed by passing the vapors through water. A gas passes off which contains butadiene, with some decomposition and other products. Other unsaturated mono-chlorids may be treated in a similar manner.

The temperatures specified in the examples are suitable for carrying out the invention, but we do not limit ourselves to these temperatures. In general the temperature suitable for a particular mono-halid is adjusted during the preparation by raising the temperature until hydrochloric acid is freely evolved, which may be detected, for example by determining the acidity of the condensed water.

The vessels or tubes in which the process is carried out may be made of a resistant material, for example silica.

We do not limit ourselves to any particular method of heating, which may be external, or internal, say by means of an electric resistance.

What we claim is:—

1. A process of making unsaturated hydrocarbons from mono-halogen substitution derivatives of hydrocarbons including a chain containing the chlorin atom which comprises treating such derivatives with steam at a temperature at which the halogen atom is freely evolved as hydro-halogenic acid but which temperature is below that at which any considerable secondary decomposition takes place.

2. A process of making unsaturated hydrocarbons from mono-halogen substitution derivatives of hydrocarbons including a chain containing the chlorin atom which comprises treating said derivatives with steam at a temperature at which the halogen atom is freely evolved as hydro-halogenic acid but which temperature is below that at which any considerable secondary decomposition takes place, said treatment being effected in the presence of a catalyst capable of aiding the splitting off of halogen acid.

3. A process of making unsaturated hydrocarbons which comprises passing monochlor aliphatic hydrocarbons and steam through a tube heated to about a dull red heat.

4. A process of making unsaturated hydrocarbons from mono-halogen substitution derivatives of hydrocarbons including a chain containing the chlorin atom which comprises treating them with steam at a temperature above a dull red heat but not over about 700° C.

In testimony whereof we have signed our names to this specification in the presence of two subscribing witnesses.

FRANCIS EDWARD MATTHEWS.
HENRY JAMES WHEELER BLISS.
HARRY MONTAGU ELDER.

Witnesses:
  GILBERT FLETCHER TYAM,
  VINCENT GIARDELLI.